(12) United States Patent
Inui (10) Patent No.: US 7,413,827 B2
(45) Date of Patent: Aug. 19, 2008

(54) CAR POWER SOURCE APPARATUS

(75) Inventor: Shinya Inui, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 426 days.

(21) Appl. No.: 11/135,386

(22) Filed: May 24, 2005

(65) Prior Publication Data

US 2005/0264257 A1    Dec. 1, 2005

(30) Foreign Application Priority Data

May 26, 2004   (JP)  ............................... 2004-156872

(51) Int. Cl.
| | |
|---|---|
| H01M 10/50 | (2006.01) |
| H01M 2/12 | (2006.01) |
| H01M 6/42 | (2006.01) |
| H02J 7/04 | (2006.01) |
| H05B 1/00 | (2006.01) |
| H05B 6/10 | (2006.01) |
| B60K 1/00 | (2006.01) |
| B60K 16/00 | (2006.01) |
| B60R 22/00 | (2006.01) |
| H02H 7/18 | (2006.01) |

(52) U.S. Cl. ........................ 429/62; 429/83; 429/120; 429/156; 320/150; 219/209; 219/635; 180/65.2; 180/65.3; 180/65.4; 307/10.6; 307/10.7

(58) Field of Classification Search ................. 320/150; 219/209, 635; 180/65.2, 65.3, 65.4; 429/62, 429/120, 156, 83; 307/10.6, 10.7
See application file for complete search history.

(56) References Cited

U.S. PATENT DOCUMENTS

| | | | |
|---|---|---|---|
| 5,397,991 A | * | 3/1995 | Rogers ........................ 320/160 |
| 6,278,260 B1 | * | 8/2001 | Yang ........................... 320/150 |
| 2003/0162084 A1 | * | 8/2003 | Shigeta et al. ................ 429/62 |

FOREIGN PATENT DOCUMENTS

JP     2003-223938     8/2003

* cited by examiner

*Primary Examiner*—Bao Q. Vu
*Assistant Examiner*—Jue Zhang
(74) *Attorney, Agent, or Firm*—Wenderoth, Lind & Ponack, L.L.P.

(57) ABSTRACT

A car power source apparatus is provided with a driving battery which drives an electric motor, heaters which heat the driving battery, a control circuit which controls power to the heaters, a temperature sensor which detects battery temperature and issues a detected temperature signal to the control circuit, and a surrounding temperature sensor which detects surrounding temperature and also issues a detected temperature signal to the control circuit. When the car is not being driven and the driving battery is heated via the heaters powered by the driving battery, the set temperature is changed corresponding to the detected surrounding temperature in the control circuit.

16 Claims, 12 Drawing Sheets

Table of Conditions for Heater-ON

Heater is ON for battery temperature less than or equal to the set temperature below, and OFF for battery temperature greater than the set temperature below.
ON and OFF conditions use linear interpolation based on the data below.

| surrounding temp. [°C] | set temperature [°C] |
|---|---|
| ≧ 0 | 0 |
| -10 | 0 |
| -20 | -8 |
| -30 | -15 |
| -40 ≧ t > -50 | -25 |

CAR POWER SOURCE APPARATUS

BACKGROUND OF THE INVENTION

1. Field of the Invention

This invention relates to a car power source apparatus provided with heaters to increase the temperature of the driving battery that powers the electric drive motor of a vehicle, such as an automobile, when temperatures are low.

2. Background Art

When temperatures become extremely low, battery output decreases and sufficient performance cannot be obtained. Consequently, when a hybrid car is used in a frigid location and the temperature of the driving battery becomes low, sufficient battery performance cannot be output when beginning to move or accelerate the car. A hybrid car is designed to normally run on both an engine and an electric motor. If performance of the driving battery decreases and power from the motor is insufficient, the hybrid car cannot operate normally. This drawback can be resolved by warming-up (heating) the battery. To realize this, the present applicant developed a power source apparatus which warms-up rechargeable batteries via heaters (see Japanese Laid-Open Patent Publication 2003-223938).

The power source apparatus disclosed in this patent publication is provided with a driving battery comprising a plurality of rechargeable batteries, and a heating plate, with heaters mounted on it, to warm-up (heat) the rechargeable batteries of the driving battery. The heating plate is disposed in close proximity to the rechargeable batteries to allow efficient heating of those rechargeable batteries. Electric current is passed through the heating plate heaters of this power source apparatus to heat the heaters via Joule heating. Many heaters are disposed in close proximity to many rechargeable batteries to heat those batteries.

SUMMARY OF THE INVENTION

In the power source apparatus of the above patent disclosure, when the ignition switch is off, that is when the car is not being driven, heaters are not heated by power from the driving battery to prevent over-discharge of the driving battery. Consequently, when external temperature is low and the car is driven after having the ignition switch in the off state, driving battery temperature is low and it is difficult to obtain sufficient output from the driving battery.

The present invention was developed to solve these problems. Thus it is an object of the present invention to provide a car power source apparatus which can heat the driving battery when external and surrounding temperatures are low, and while preventing driving battery over-discharge.

The above and further objects and features of the invention will more fully be apparent from the following detailed description with accompanying drawings.

The car power source apparatus of the present invention is provided with a driving battery which powers an electric motor that drives the vehicle, heaters which heat the driving battery until a set temperature is reached, a control circuit which controls electric power to the heaters, a temperature sensor which detects battery temperature and outputs a detected temperature signal to the control circuit, and a surrounding temperature sensor which detects the temperature surrounding the driving battery and also outputs a detected temperature signal to the control circuit. The car power source apparatus is characterized by changing the set temperature in the control circuit depending on the detected surrounding temperature when the car is not being driven and the driving battery is heated by heaters powered by the driving battery. In addition, the car power source apparatus is characterized by the set temperature having a value which is 0 to 15° C. added to the surrounding temperature.

In the car power source apparatus described above, when the car is not being driven and the driving battery is heated by the heaters with electric power from the driving battery, the set temperature is changed in the control circuit to correspond to the detected surrounding temperature. Further, the set temperature is equal to 0 to 15° C. added to the detected surrounding temperature. Since a conventional apparatus heats to a pre-set temperature independent of the surrounding temperature, a large amount of electric power is required, and the load on the driving battery is large. However, in the apparatus described above, the set temperature is changed according to the surrounding temperature to a value which is 0 to 15° C. added to the surrounding temperature. Therefore, large amounts of electric power are not demanded from the driving battery and its load is reduced.

DETAILED DESCRIPTION OF THE PREFERRED EMBODIMENTS

First, the structure of embodiments of power source apparatus of the present invention are described using FIGS. 1-9. Next, electric circuitry is described using the circuit embodiment of the block diagram shown in FIG. 10.

Figure 1:
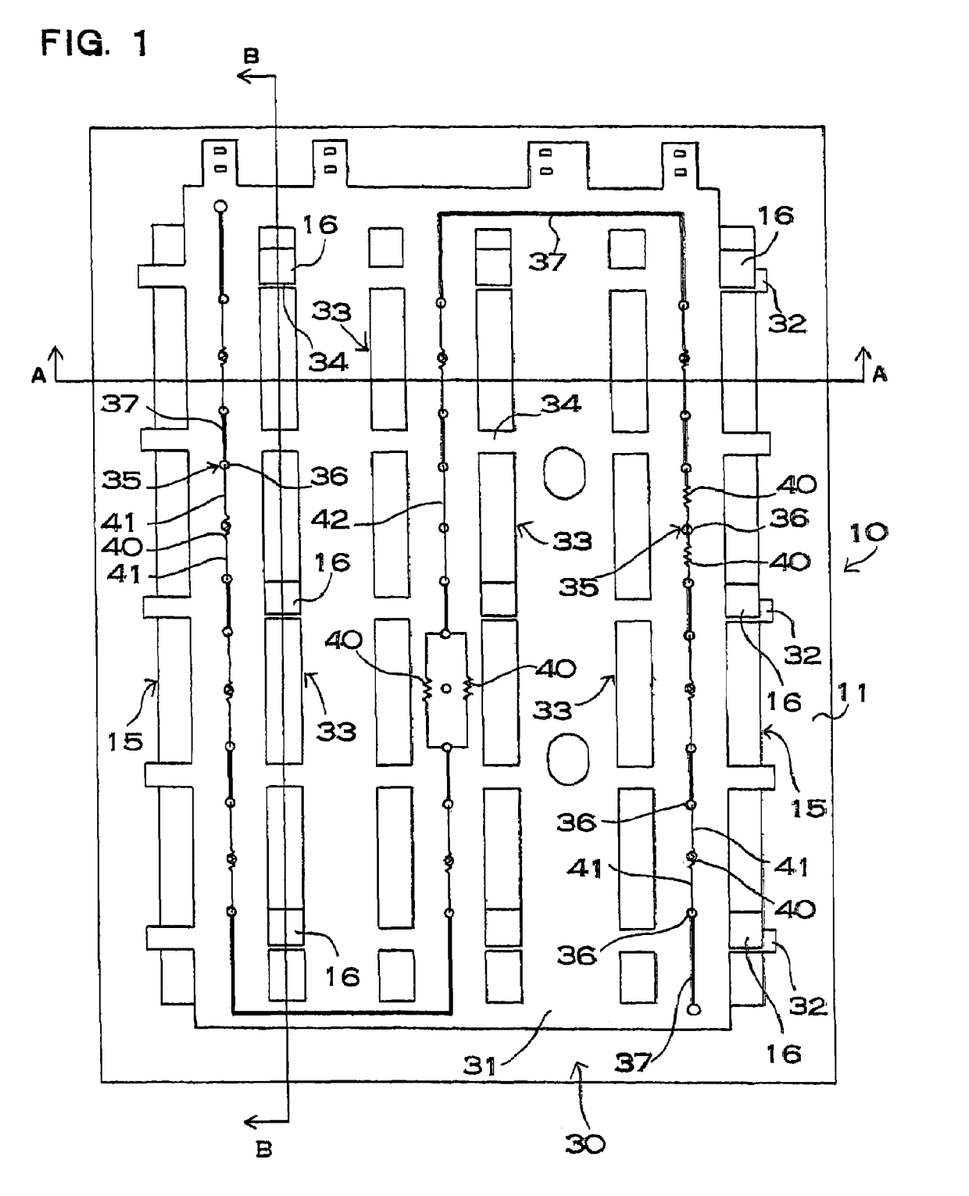
FIG. 1 is a plan view of an embodiment of a car power source apparatus of the present invention.
Figure 2:
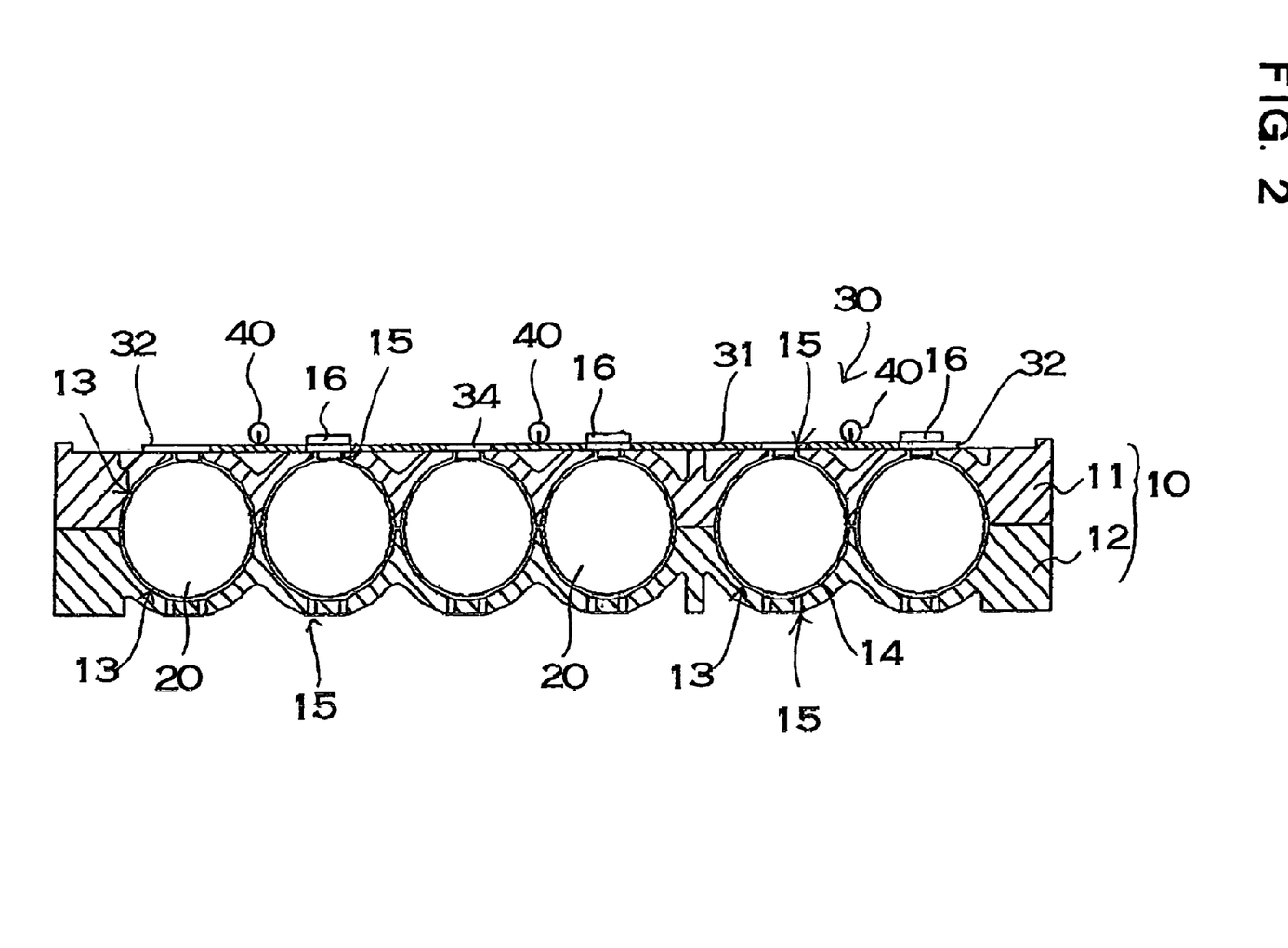
FIG. 2 is a cross-sectional view through the line A-A on the power source apparatus shown in FIG. 1.
Figure 3:
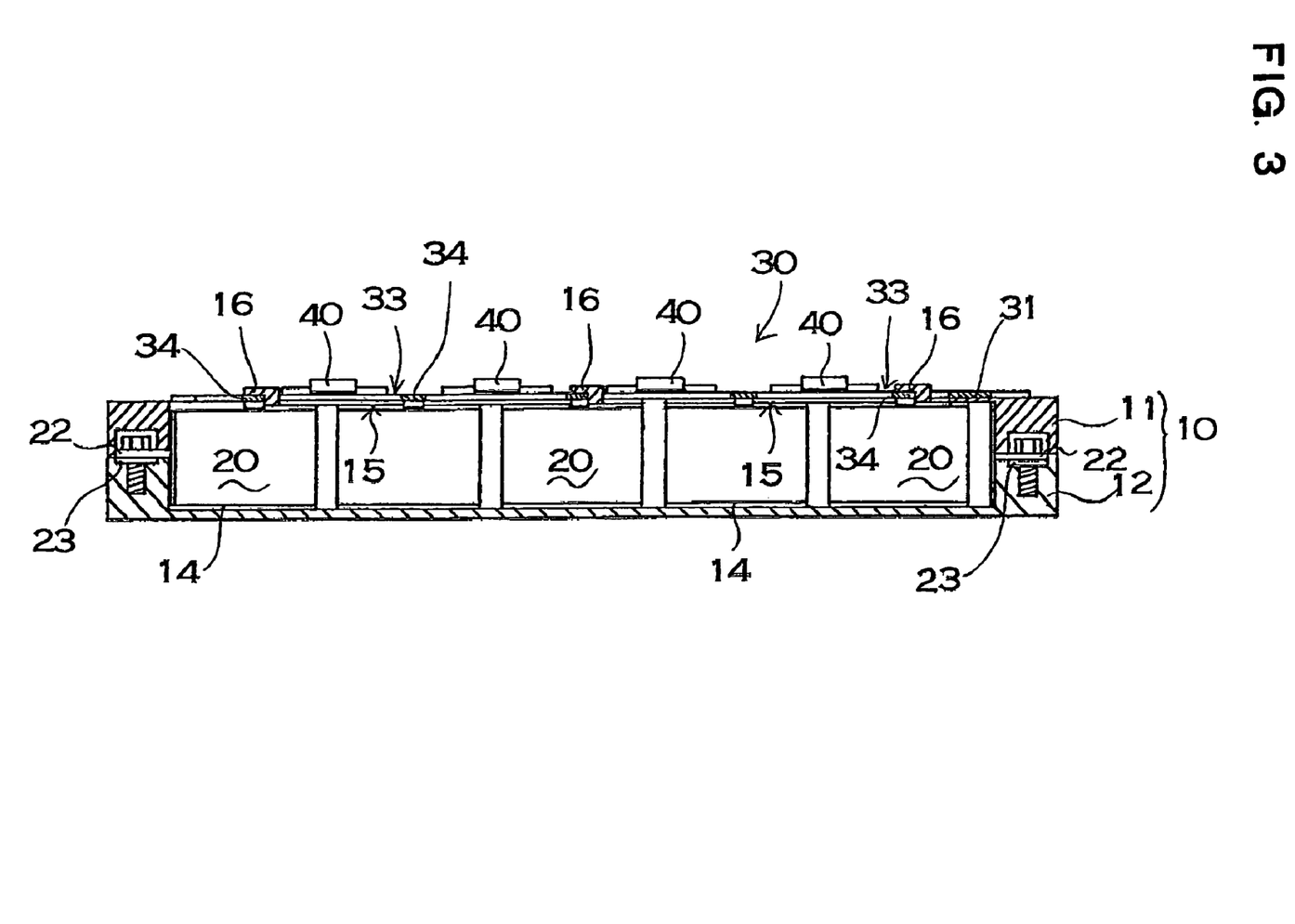
FIG. 3 is a cross-sectional view through the line B-B on the power source apparatus shown in FIG. 1.
Figure 4:
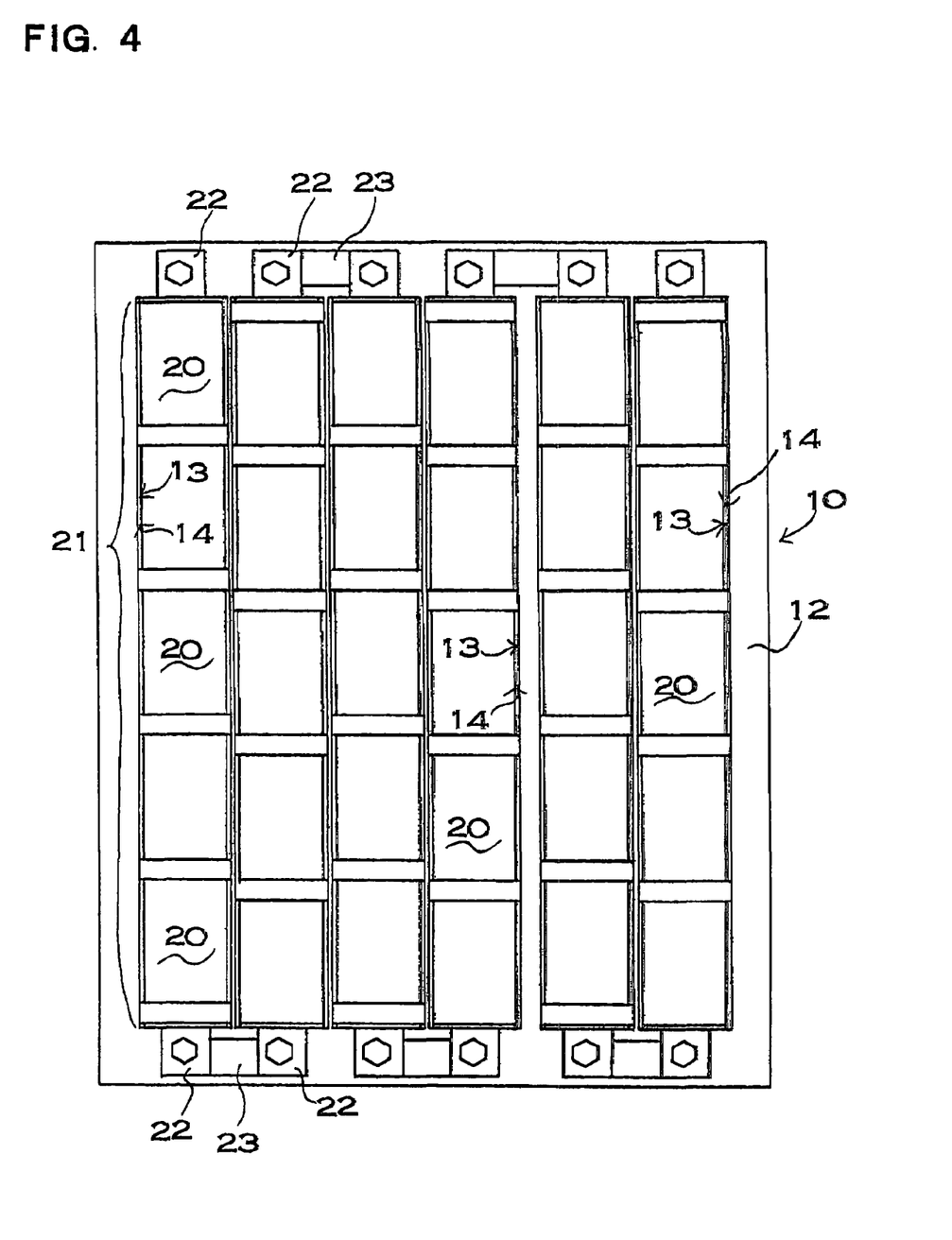
FIG. 4 is a plan view showing the power source apparatus shown in FIG. 1 with the case open.

FIGS. 1-4 show an embodiment of a car power source apparatus of the present invention. FIG. 1 is a plan view, FIG. 2 is a lateral cross-sectional view, FIG. 3 is a vertical cross-sectional view, and FIG. 4 is a plan view showing the case 10 open. This power source apparatus has a plurality of rechargeable batteries 20 arranged inside a case 10. The power source apparatus has a plurality of rechargeable batteries 20 separated into modules 21 and housed in the case 10. A battery module 21 is a plurality of series connected rechargeable batteries 20 joined in a straight-line fashion. Rechargeable batteries 20, which make up a battery module 21, are circular cylindrical nickel hydrogen batteries. However, other batteries which can be recharged, such as lithium-ion rechargeable batteries or nickel cadmium batteries, can also be used as the rechargeable batteries. Further, batteries can be rectangular batteries instead of circular cylindrical batteries.

The case 10 houses a plurality of battery modules 21 arranged parallel to each other and in the same plane. Battery modules 21, lined-up laterally, are connected in series to increase output voltage. In the case 10 shown in the figures, battery modules 21 are housed between a first case section 11 and a second case section 12. The first case section 11 and the second case section 12 are provided with insertion grooves 13 to hold the battery modules 21. The interior shape of the insertion grooves is made very slightly larger than the outline of the battery modules 21. Ventilation gaps 14, which conduct air flow, are created in the case 10 between the inside surfaces of the insertion grooves 13 and the outside surfaces of the battery modules 21. In addition, ventilating holes 15 are opened through the bottom of insertion grooves 13 in the first case section 11 and in the second case section 12. Cooled ventilating air is introduced to the case 10 from the ventilating holes 15 and allowed to flow through the ventilation gaps 14. Cooling air, which flows through the ventilation gaps 14, flows over the surfaces of the battery modules 21 to cool the battery modules 21.

Figure 5:
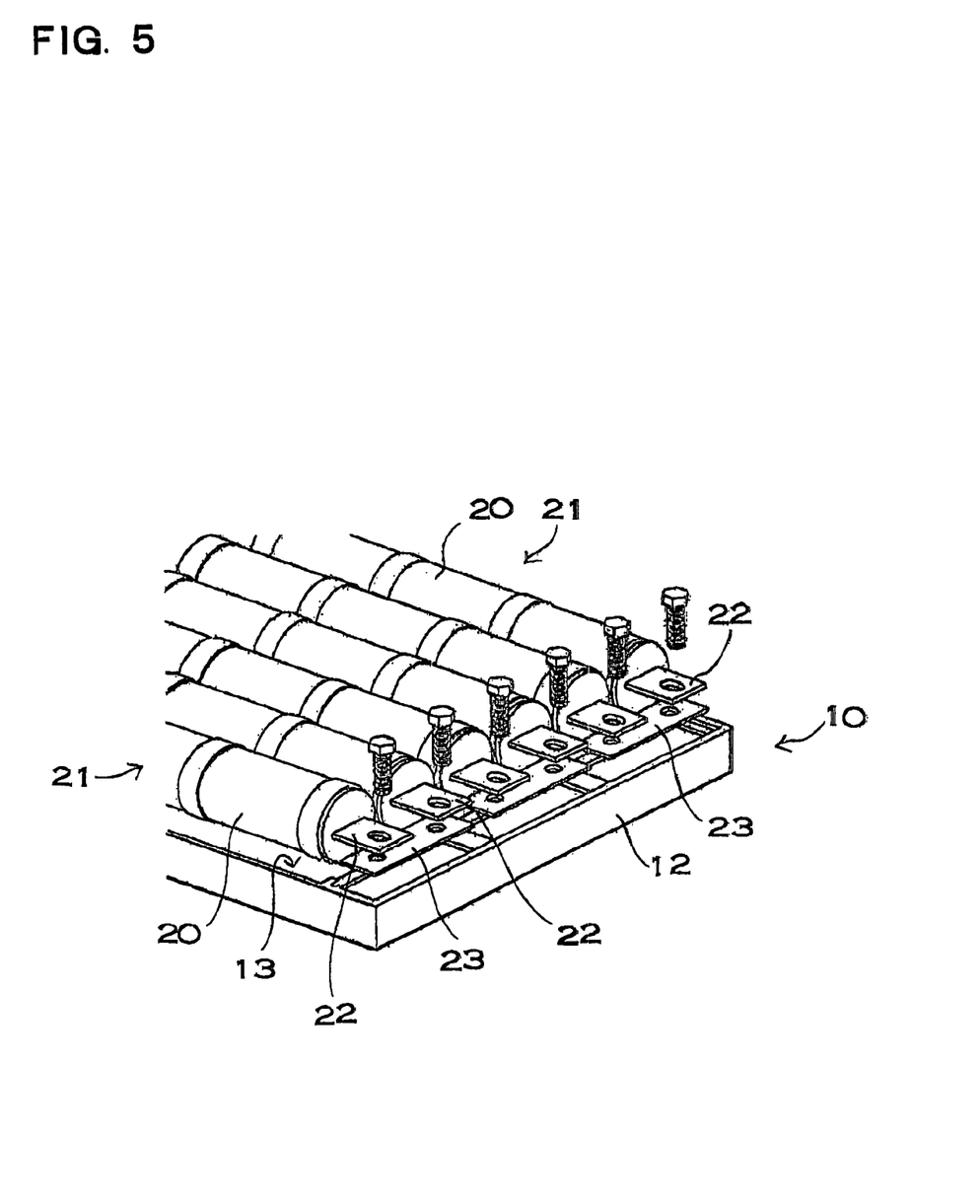
FIG. 5 is an exploded perspective view showing battery modules housed in the case.
Figure 6:
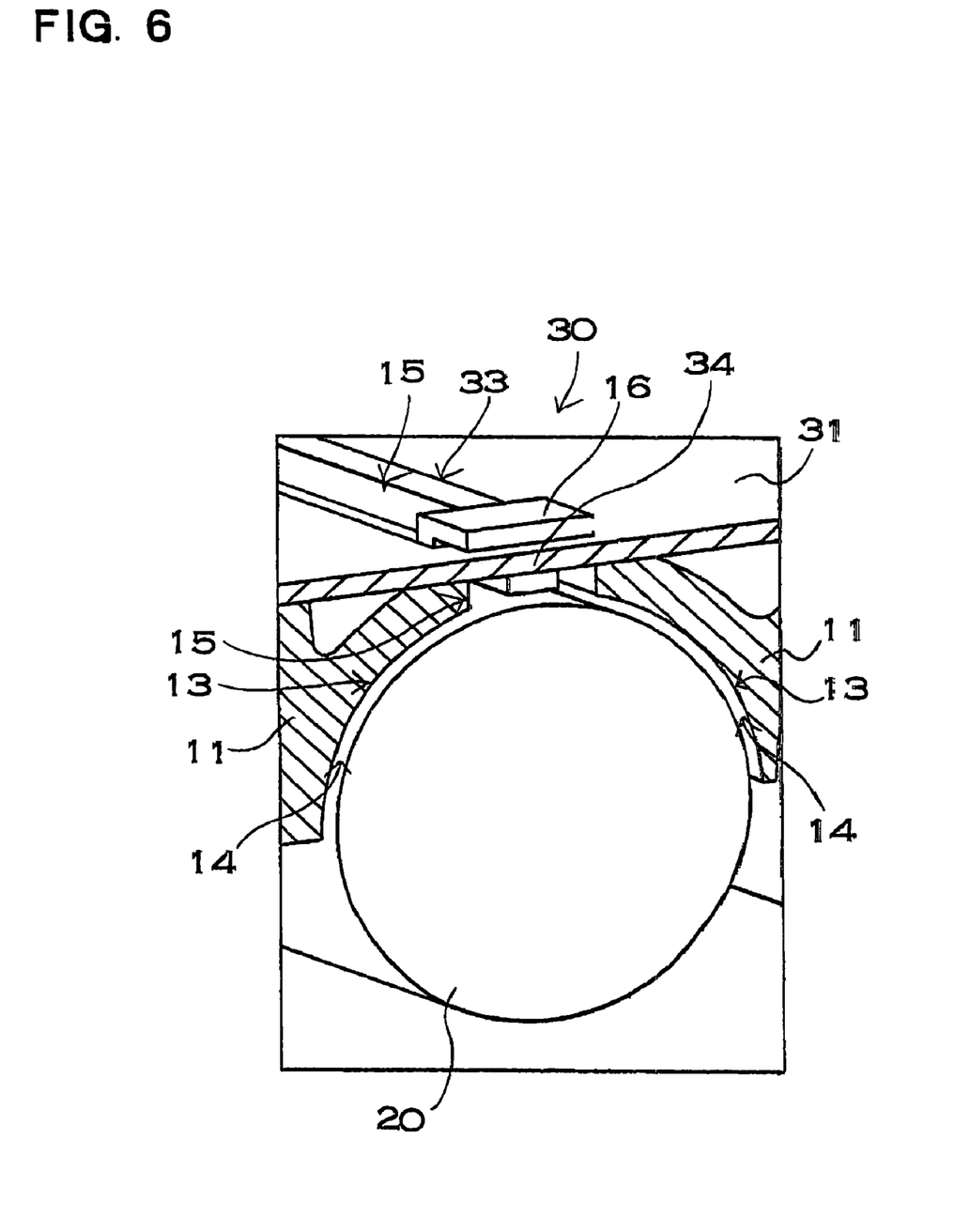
FIG. 6 is an perspective cross-sectional view showing the connecting structure of the heating plate and the case.

Battery modules 21 are attached at both ends to the case 10 and disposed so as to be separated from the inside surfaces of the insertion grooves 13. Battery modules 21 have terminals 22 fixed at both ends in a manner that projects from battery end planes for connection to the case 10. This structure is shown in FIG. 5. The battery modules 21 of this figure have terminals 22 fixed perpendicular to battery end planes. Battery terminals 22 are attached with bolts to bus bars 23 that fit in prescribed positions in the second case 12. Bus bars 23 link adjacent battery modules 21 together, and electrically connect battery modules 21 in series. Bus-bars 23 and terminals 22 are sandwiched between the second case section 12 and the first case section 11 holding them in fixed positions. Battery modules 21 are held in insertion grooves 13 via the terminals 22. Battery modules 21 are fixed inside the case 10 in a manner that establishes ventilation gaps 14 for air passage between battery modules 21 and inside surfaces of the insertion grooves 13. In this configuration, air flowing in from the ventilating holes 15 passes through the ventilation gaps 14 to efficiently contact, and exchange heat with battery module 21 surfaces.

As shown in FIGS. 1-3, the power source apparatus is provided with a heating plate 30, on which heaters 40 for warming the rechargeable batteries 20 are mounted. A plurality of rechargeable batteries 20 are lined up parallel to each other and disposed in proximity to the surface of the heating plate 30. In the power source apparatus of the figures, the heating plate 30 is disposed on top of the first case section 11, and is attached to the upper surface of the case 10. The surface of the first case section 11 of the power source apparatus is disposed between the heating plate 30 and the rechargeable batteries 20 housed in the case 10. However, in the power source apparatus of the present invention, the orientation shown in these figures may be inverted, thereby disposing the heating plate below the second case section, and attaching it to the bottom surface of the case which houses the rechargeable batteries.

The heating plate 30 is provided with an insulated board 31 and a plurality of heaters 40 mounted on the insulated board 31. As shown in the plan view of FIG. 1, the insulated board 31 is provided with projections 32 at its perimeter and connecting regions 34 between ventilation slits 33 to allow attachment to the case 10. The first case section 11 has fastening hooks 16 formed as a single-piece structure to mate with perimeter projections 32 and connecting regions 34 on the insulated board 31. As shown in the plan view of FIG. 1 and the perspective cross-sectional view of FIG. 6, the heating plate 30 mounts on the first case section 11 by inserting perimeter projections 32 and connecting regions 34 into the fastening hooks 16.

The first case section 11 has ventilating holes 15 opened through its base, which is a wall of the case 10. The insulated board 31 of the heating plate 30 is provided with ventilation slits 33, which form continuous air passages with the ventilating holes 15. The ventilating holes 15 of the first case section 11 are shaped as slits which extend in the direction of the battery modules 21. The ventilation slits 33 of the insulated board 31 are also slit-shaped openings which extend in the direction of the battery modules 21. The ventilating holes 15 of the first case section 11 and the ventilation slits 33 of the insulated board 31 are open in corresponding locations, and thus the heating plate 30 does not block ventilating holes 15. Air passes through the ventilation slits 33 and ventilating holes 15 into the case 10 to cool, or warm the rechargeable batteries 20. Hot heaters 40 on the heating plate 30 heat air, which passes through the ventilation slits 33 and ventilating holes 15 into the case 10 to warm the rechargeable batteries 20. In addition, heaters 40 heat the heating plate 30, the heating plate 30 heats the case 10 by conduction, and the case 10 heats the rechargeable batteries 20. Although not illustrated, a power source apparatus, with an orientation inverted relative to that shown in FIG. 2 attaching the heating plate to the bottom surface of the case, can warm rechargeable batteries more efficiently because air warmed by the heating plate becomes lighter and rises through the ventilation slits and ventilating holes into the ventilation gaps.

The heating plate 30 has a plurality of heaters 40 connected in series and mounted on the insulated board 31. Heaters 40 are electronic parts which generate heat when powered, such as resistors, semiconductors, or PTC devices. The heating plate 30 passes current through the heaters 40 to Joule heat each individual heater 40 and warm the rechargeable batteries 20 by heat generated by the heaters 40.

The heating plate 30 has ventilation slits 33 opened through the insulated board 31 and heaters 40 are mounted between those ventilation slits 33. When the insulated board 31 is attached to the first case section 11, ventilation slits 33 and ventilating holes 15 align to the same locations. A plurality of heaters 40 are mounted on the insulated board 31 to warm the rechargeable batteries 20.

The insulated board 31 is a printed circuit board provided with a plurality of connecting holes 35 for inserting, and solder attaching wire leads 41 of heaters 40. Connecting holes 35 have conducting rings 36 around their perimeters. Electrical connection is made between connecting hole 35 conducting rings 36 via conducting runs 37 on the printed circuit board surface in regions where no heaters 40 are attached. No connection is made on the circuit board between connecting hole 35 conducting rings 36 where heaters 40 are mounted. Heaters 40 are mounted on the insulated board 31 by inserting their wire leads 41 into connecting holes and soldering the wire leads 41 to the conducting rings 36.

Heaters 40 are solder attached to the connecting holes 35 to connect them in series. All heaters 40 soldered to, and mounted on the printed circuit board have the same resistance value. If heaters 40 of the same resistance are connected in series, all heaters 40 will generate equal amounts of heat when powered. This is because the amount of heat generated is proportional to the product of the resistance and the square of the current. However, the heating plate 30 which warms a plurality of rechargeable batteries 20 is not limited to uniform heating that allows uniform heating of all rechargeable batteries 20. For example, battery modules 21 located at the periphery of the case 10 can be more easily cooled than battery modules 21 at the center. It is not important for the heating plate 30 to generate heat uniformly over its entire area, but rather it is important to warm all the rechargeable batteries 20 uniformly.

Local heating of the heating plate 30 of FIG. 1 can be adjusted by the number of heaters 40 connected in parallel or by jumper wires 42 connected in place of heaters 40. This is because the amount of heat generated by a resistor is determined by the product of the square of the current and the resistance value. Therefore, a jumper wire 42 can replace a heater 40, for example, and generate no heat. Since the resistance of a jumper wire 42 is approximately 0Ω, no heat is generated regardless of current flow. In addition, the amount of heat generated by the series connected heaters 40 can be adjusted by a number of parallel connected heaters 40. For example, the amount of heat generated at a heater 40 mounting site can be cut in half by connecting two heaters 40 in parallel. This is because heater 40 resistance can be cut in half by connecting two heaters 40 in parallel. Further, the amount of heat generated can be reduced to one third by connecting three heaters 40 in parallel at a heater mounting site. In addition, resistance, and the amount of heat generated can be doubled by connecting two heaters 40 in series at a heater mounting site. In the heating plate 30 of FIG. 1, two heaters 40 are connected in series to increase the amount of heat generated at the sides, and jumper wires 42 are connected in place of heaters 40 to reduce heat generated at the center region. This allows the amount of heat generated by the heating plate 30 to be locally adjusted, and it allows a plurality of rechargeable batteries 20 to be heated uniformly.

Figure 7:
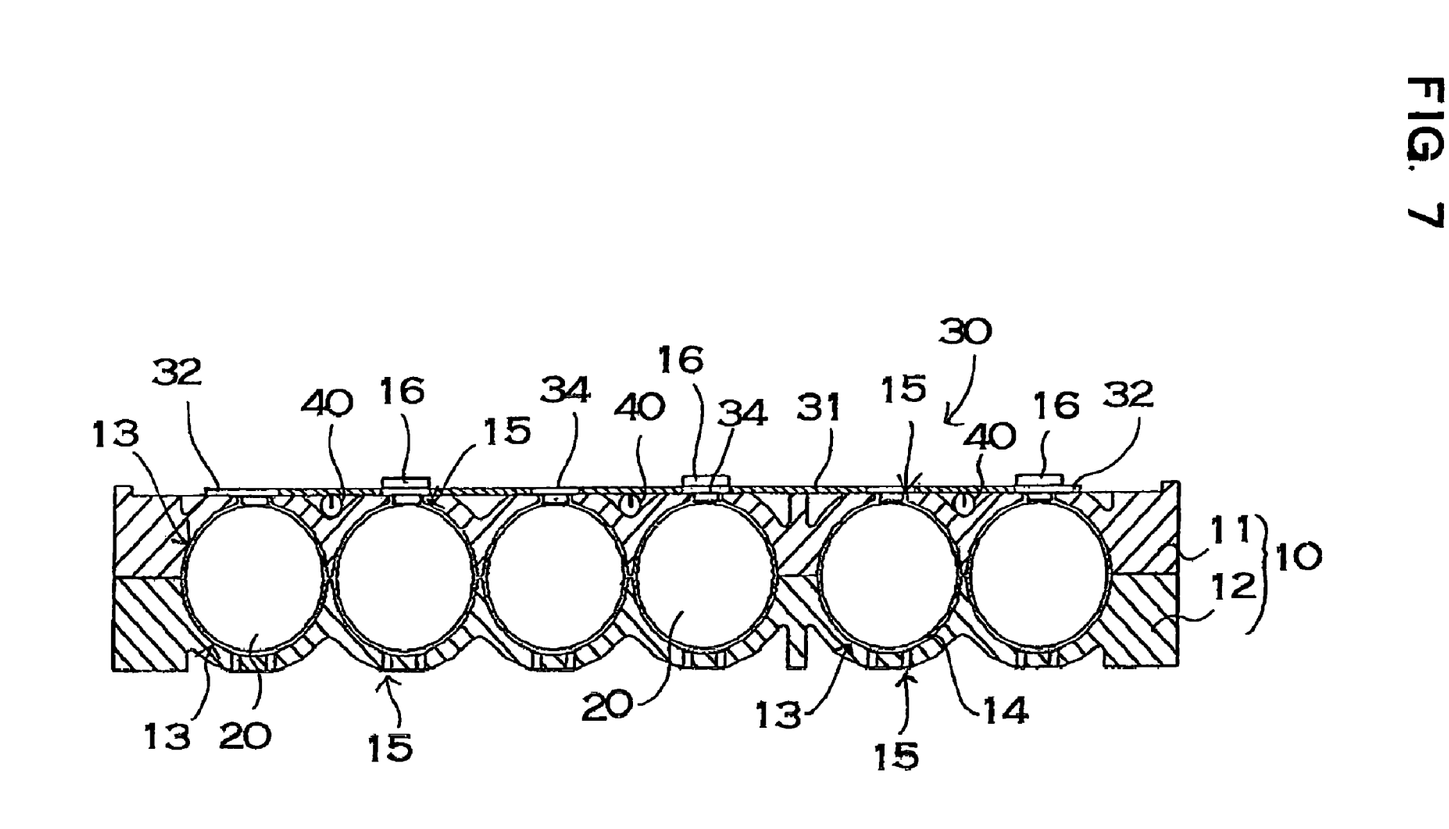
FIG. 7 is a lateral cross-sectional view of another embodiment of a car power source apparatus of the present invention.

As shown in another example in FIG. 7, heaters 40 can also be mounted on the side of the heating plate which opposes the rechargeable batteries 20. Heaters 40 disposed in this fashion heat the first case section 11 and the first case section 11 in turn heats the rechargeable batteries 20. The first case section 11 of the figure takes the shape of the inside surfaces of the insertion grooves 13 which follows the contour of the surfaces of rechargeable batteries 20. The first case section 11, which is heated by the heaters 40, heats rechargeable batteries 20 by radiant heat or by air in the ventilation gaps 14. A power source apparatus with this structure can be installed in an automobile in a vertical disposition, or in an orientation which is inverted with respect to FIG. 7 allowing rechargeable batteries to be heated by the heating plate without using a fan. In the embodiment of this figure, structural elements which are the same as the previous embodiment are labeled with the same part number.

Figure 8:
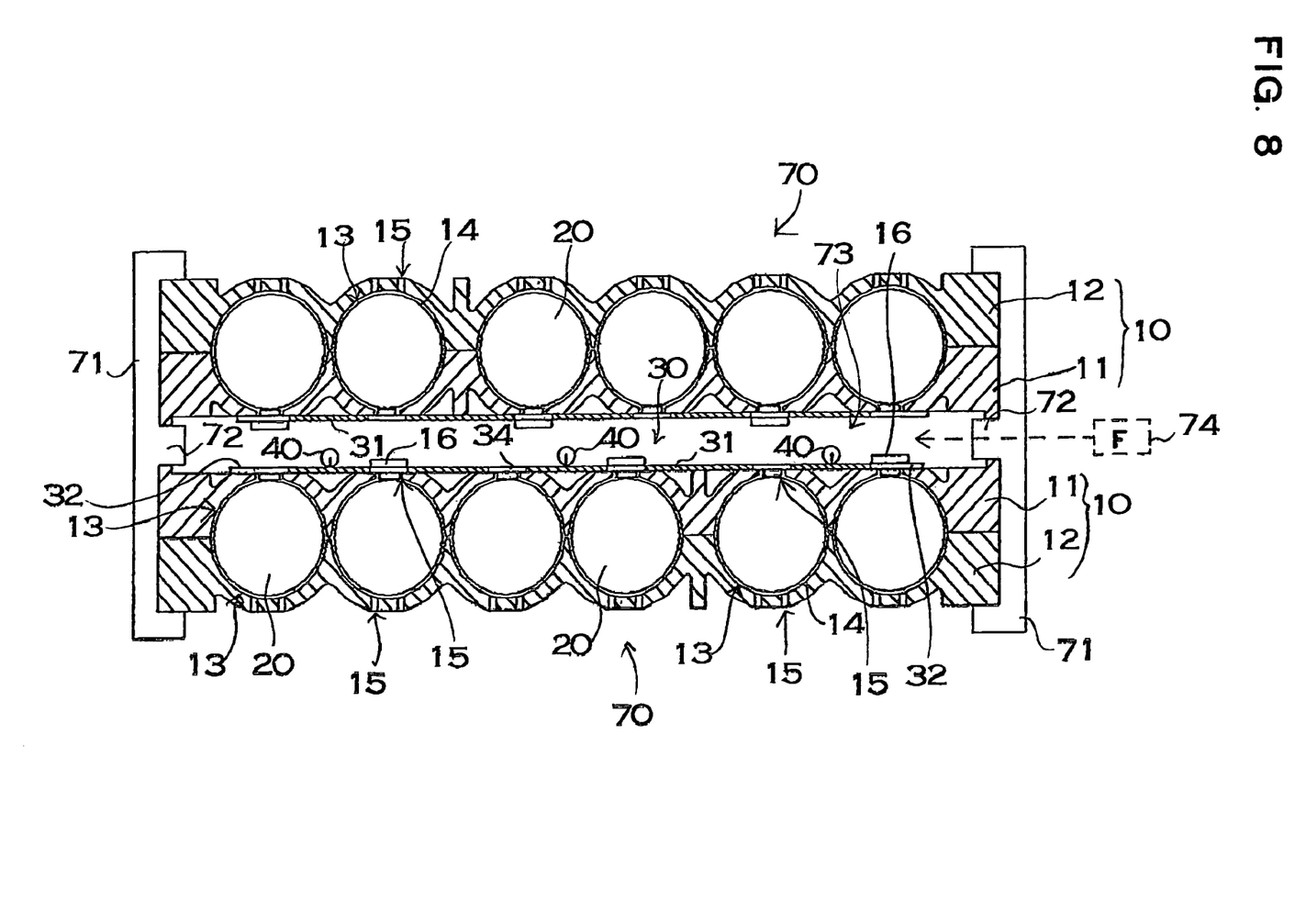
FIG. 8 is a lateral cross-sectional view of another embodiment of a car power source apparatus of the present invention.
Figure 9:
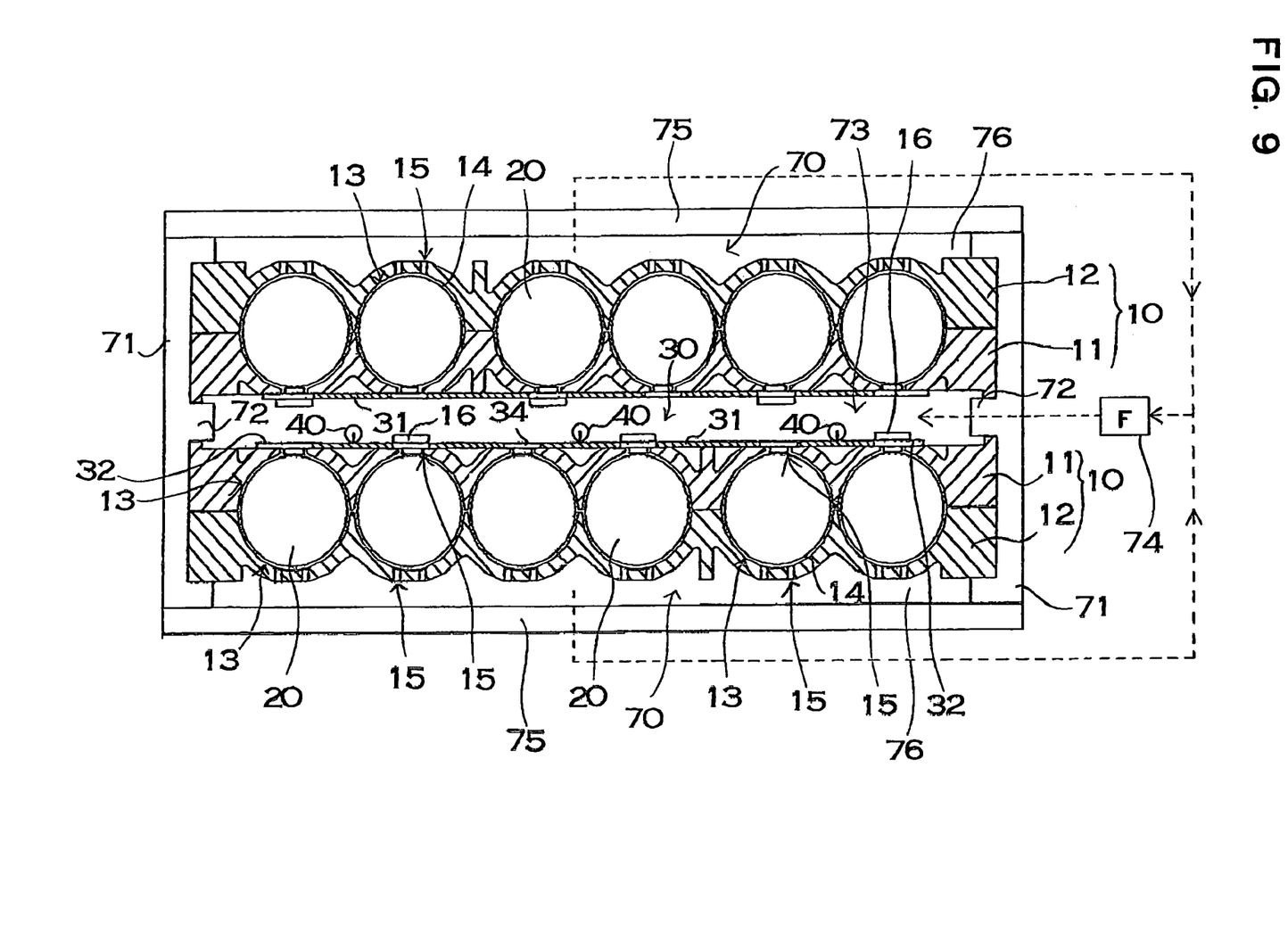
FIG. 9 is lateral cross-sectional view of another embodiment of a car power source apparatus of the present invention.

FIG. 8 shows a power source apparatus which uses the rechargeable batteries 20 and case 10 cited in FIGS. 1-7. In FIG. 8, a case 10, which houses rechargeable batteries 20, is taken to be a case unit 70, and two rows of these case units 70 are stacked and joined together. FIG. 9 uses the power source apparatus of FIG. 8, and shows a configuration which circulates air.

In FIGS. 8 and 9, the bottom row case unit 70 has the same configuration as the power source apparatus shown in FIG. 2, while the top row case unit 70 is inverted with respect to the power source apparatus shown in FIG. 2. Consequently, structural elements of the embodiments of these figures, which are the same as the embodiment shown in FIG. 2, are labeled with the same part number and their description is omitted.

In the power source apparatus shown in FIGS. 8 and 9, two case units 70 are separated and disposed horizontally in two rows establishing an air duct 73 between the top row case unit 70 and the bottom row case unit 70. The two case units 70 are stacked and joined together orienting the heating plates 30 in mutual opposition. In this power source apparatus with two rows of case units 70, a plurality of rechargeable batteries 20 are disposed in two opposing parallel planes, an air duct 73 is established between those two parallel planes, and the heaters 40 are disposed in that air duct 73. The two case units 70 are joined together by an external case 71. The external case 71 of the figures has alignment projections 72 in the center region to hold the two case units 70 with a prescribed gap between them. Thickness of the alignment projections 72 of the external case 71 is set for optimum gap size between the two case units 70. External case components 71, 71 are approximately rectangular boards of resin material, and are disposed on the left and right sides of the page in reference to the power source apparatus shown in FIG. 1. This configuration of power source apparatus heats the air duct 73 via the heaters 40, and in turn heats rechargeable batteries 20 above and below via the air duct 73. The heaters 40 in the air duct 73 heat both the air in the air duct 73 and the cases 10 to heat the rechargeable batteries 20. The air duct 73 is not air-tight, but it is an enclosed space. As a result, heaters 40, which heat this air duct 73, efficiently heat rechargeable batteries 20 through the air and through the cases 10.

In the power source apparatus of FIGS. 8 and 9, a heating plate 30 is attached to the upper surface of the case unit 70 disposed in the bottom row. In addition, the heating plate 30 of the top row case unit 70 of the power source apparatus of the figures is not provided with heaters 40. Rechargeable batteries 20 housed in the top row case unit 70 are heated by heaters 40 mounted on the heating plate 30 of the bottom row case unit 70. A power source apparatus, which has heaters 40 on only one of the heating plates 30, has the characteristic that many rechargeable batteries 20 can be effectively heated while reducing the number of heaters 40, and more specifically the amount of energy consumption. In particular, a configuration disposing heaters 40 on the bottom row heating plate 30, efficiently heats rechargeable batteries 20 housed in the bottom row case unit 70 via heat conducted from the bottom row heating plate 30 to the first case section 11. Rechargeable batteries 20 housed in the top row case unit 70 are efficiently heated by heated air, which becomes lighter and rises to flow through top row ventilation slits 33 and ventilating holes 15. Consequently, all rechargeable batteries can be efficiently and uniformly heated with low power consumption. However, heaters can also be disposed on the heating plate of the top row case unit, or heaters can be disposed on heating plates of both the top and bottom row case units. Further, as shown by the broken line arrows indicating air flow paths in the figures, air heated by the heating plate 30 can be induced to flow and heat rechargeable batteries 20 via a fan 74 (labeled F in the figures). After heating the rechargeable batteries 20, air is discharged through the ventilating holes 15 located at the top and bottom of the power source apparatus. Although not illustrated, openings such as through-holes are established through the external case 71 at one end where a broken line arrow indicates air flow from the fan 74 through the external case 71.

The power source apparatus of FIG. 9 takes the shape of unit box, and air heated by the heating plate 30 is circulated inside the cases 10 to heat the rechargeable batteries 20. Plates 75, 75, which are roughly rectangular boards of resin material, are disposed on both the top and bottom of the power source apparatus. In addition, end plates 76, which are disposed at the top and bottom of the page in reference to the power source apparatus shown in FIG. 1, enclose air flow paths for the apparatus shown in FIG. 9. As shown in FIG. 9, a power source apparatus which circulates heated air via a fan 74 efficiently warms rechargeable batteries 20 by circulating air heated by the heaters 40 in a closed loop (air flow paths shown by broken lines in the figure). Air discharged from top and bottom row ventilating holes 15 in the apparatus of FIG. 9 pass through openings provided in the top and bottom plates 75, 75. Although not illustrated and abbreviated in structural detail, openings in the top and bottom plates 75, 75 return the discharged air to the intake side of the fan 74. It is not necessarily a requirement to mount the power source apparatus in a horizontal fashion in an automobile. The apparatus can also be mounted in an automobile in a vertical or inclined orientation. A power source apparatus with a fan 74 that circulates air heated by the heating plate 30 can effectively heat rechargeable batteries 20 regardless of orientation in the automobile. Further, air flow paths described for FIGS. 8 and 9 can be used not only when heating rechargeable batteries 20 via the heaters 40, but also can be used as cooling air paths for cooling rechargeable batteries 20.

Figure 10:
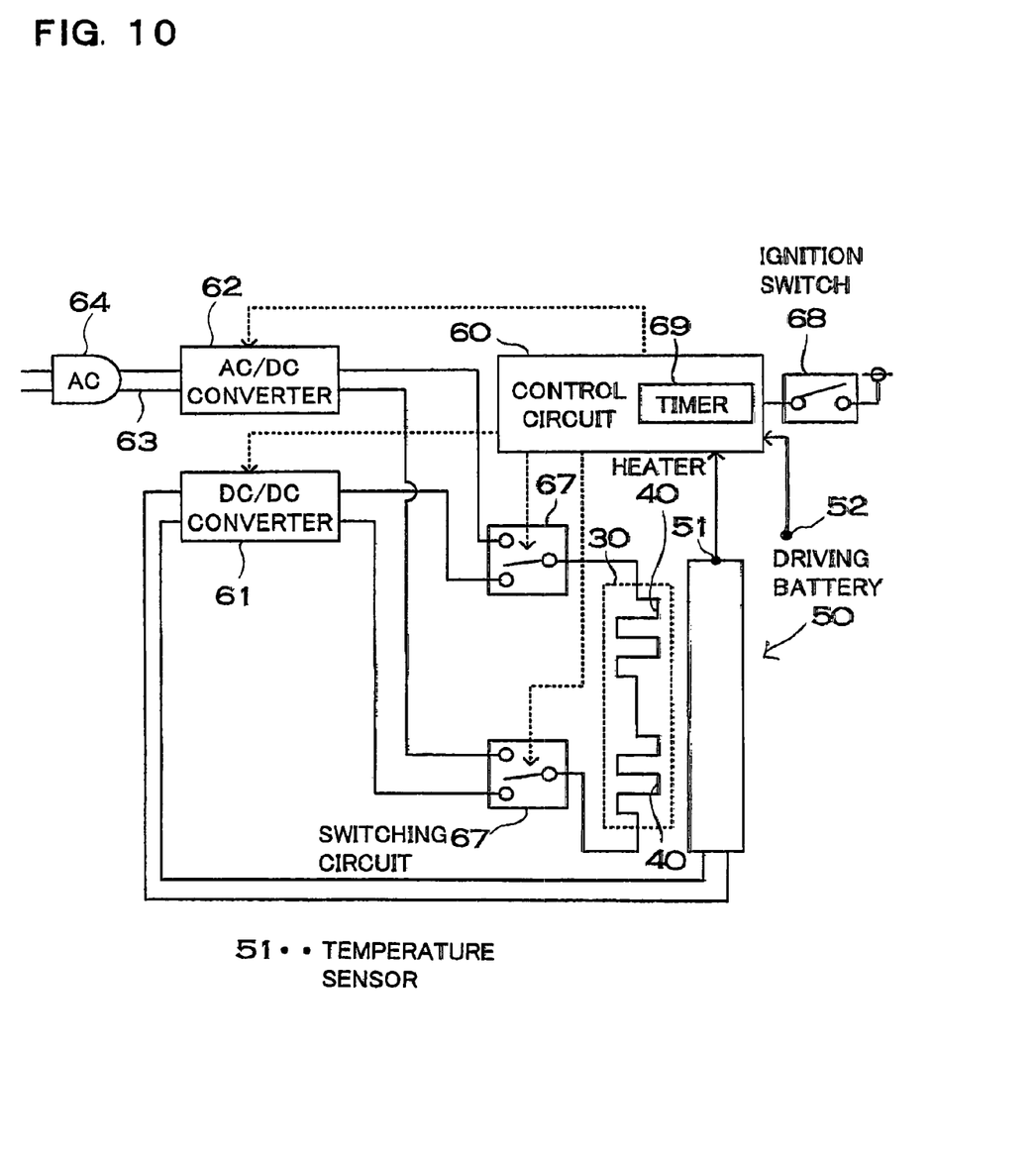
FIG. 10 is a block diagram of an embodiment of a car power source apparatus of the present invention.

FIG. 10 shows a block diagram of the power source apparatus. This power source apparatus is provided with a DC/DC converter 61 to convert driving battery 50 voltage to heater supply voltage; an AC/DC converter 62 to convert commercial power to heater supply voltage; a switching circuit 67 to switch between the DC/DC converter 61 and the AC/DC converter 62; a control circuit 60 to control the switching circuit 67, the DC/DC converter 61, and the AC/DC converter 62; and a temperature sensor 51 to detect battery temperature and issue a detected temperature signal to the control circuit 60. In addition, the power source apparatus is also provided with a surrounding temperature sensor 52 to detect the temperature surrounding the driving battery 50 and issue a detected temperature signal to the control circuit 60. For example, in the power source apparatus shown in FIG. 8, the surrounding temperature sensor 52 is disposed upstream of air flow into the fan 74 and detects a temperature close to the ambient temperature where the car is located.

The control circuit 60 is provided with a warming timer 69 that stores a warming-time, which is the time the driving battery 50 is maintained in a warmed-up condition via heaters 40 from the time the car ignition switch 68 is turned off. In this control circuit 60, the warming timer 69 begins counting when the ignition switch 68 is turned off. During the warming-time after the warming timer 69 has begun counting until time-out, the control circuit 60 controls power to the heaters 40 to maintain the driving battery 50 in a warmed-up condition. Therefore, when battery temperature drops below a set temperature, heaters 40 are powered and the driving battery 50 is heated. Thus the "warmed-up condition" above means the heaters 40 maintain battery temperature in a controlled state. Further, when the ignition switch 68 is off, specifically when the car is not being driven and the driving battery 50 is heated by the heaters 40 with electric power from the driving battery 50, the set temperature is changed in the control circuit 60 corresponding to the detected surrounding temperature. To reduce load on the battery, the set temperature during battery heating is, as previously stated, equal to 0 to 15° C. added to the surrounding temperature. In the control circuit 60, a maximum set temperature, for example 15° C., is established corresponding to temperatures equal to or greater than a specified surrounding temperature, for example 15° C. If battery temperature is equal to or greater than the maximum set temperature, the control circuit 60 controls the system not to heat the driving battery 50.

The warming-time stored in the warming timer 69 is set, for example, at 24 hours. If warming-time is set to this value, the car can be left unused for one day, then since the driving battery 50 remains warmed-up, the car can be immediately started the next day without warm-up. However, warming-time can also be set from 12 hours to 36 hours. Further, depending on the pattern of car use, warming-time can also be set less than 12 hours or longer than 36 hours. If warming timer 69 warming-time is long, the car can be immediately started without warm-up (heating) even after a long period of non-use. In the present patent application, a warmed-up condition is when battery temperature is approximately at or above the set temperature, and when battery temperature is at or above the set temperature, there is no need to supply power to the heaters. As previously mentioned, to reduce load on the battery, the set temperature during battery heating is a value equal to 0 to 15° C. added to the external, surrounding temperature. In the present patent application, when no special explanation is given, the terms "battery warm-up," "the battery is warmed-up," and "battery in the warmed-up state" imply battery heating, and mean the battery is approximately at or above the set temperature, which considers external temperature as described above. However, in an apparatus which powers the heaters 40 via the driving battery 50, the amount of driving battery 50 discharge increases when warming-time is made longer. To prevent over-discharge of the driving battery 50, the control circuit 60 monitors remaining capacity of the driving battery 50 while controlling power to the heaters 40. If remaining capacity of the driving battery 50 drops to a minimum discharge capacity, the control circuit 60 stops powering the heaters 40 to halt discharge of the driving battery 50. In the case where the heaters 40 are powered by commercial power, the heaters 40 maintain the driving battery 50 in a warmed-up condition until the time set on a commercial power timer (not illustrated) times-out. The set time of the commercial power timer is shorter than the warming-time of the warming timer 69, and for example, is 2 hours. Since driving battery 50 warm-up via commercial power does not discharge the driving battery 50, the heaters 40 can maintain the driving battery 50 in a warmed-up condition until the warming-time of warming timer 69 times-out, or until the next time the car is started.

When commercial power is input to the power source apparatus of FIG. 10, the control circuit 60 controls the switching circuit 67 to switch to the AC/DC converter 62 and supply power to the heaters 40 via the AC/DC converter 62. When commercial power is not input, the control circuit 60 controls the switching circuit 67 to switch to the DC/DC converter 61 and supply power to the heaters 40 from the driving battery 50 via the DC/DC converter 61. When the driving battery 50 is warmed-up (heated) via the DC/DC converter 61, the battery can be quickly and efficiently warmed-up (heated). This is because in addition to being heated by the heaters 40 on the heating plate 30, the driving battery 50 is also self-heated by discharge of the rechargeable batteries 20.

The AC/DC converter 62 connects to household commercial power via a power cord 63 to a commercial power outlet 64. This power source apparatus heats the heaters 40 via externally input commercial power.

The control circuit 60 detects battery temperature from a signal input from the temperature sensor 51 and controls heater 40 power on and off. The temperature sensor 51 is, for example, a thermistor. A thermistor detects temperature as a change in resistance, and inputs this to the control circuit 60. When temperature detected by the temperature sensor 51 is lower than a set temperature, the control circuit 60 powers the heaters 40 to warm the driving battery 50.

During the warming-time of the warming timer 69 and when the ignition switch 68 is turned on after the warming timer 69 has timed-out, the control circuit 60 detects battery temperature and powers the heaters 40 if detected temperature is lower than the set temperature. After the warming-time of the warming timer 69 has timed-out and the ignition switch 68 is in the off state, the heaters 40 are not powered even if battery temperature is lower than the set temperature. In addition, even when the ignition switch 68 is in the on state, if remaining capacity of the driving battery 50 is less than a set capacity, the heaters 40 will not be powered even if battery temperature is lower than the set temperature. This is to prevent over-discharge of the driving battery 50. When the driving battery 50 is charged and its remaining capacity is greater than the set capacity, the heaters 40 will be powered to warm-up (heat) the driving battery 50.

Figure 11:
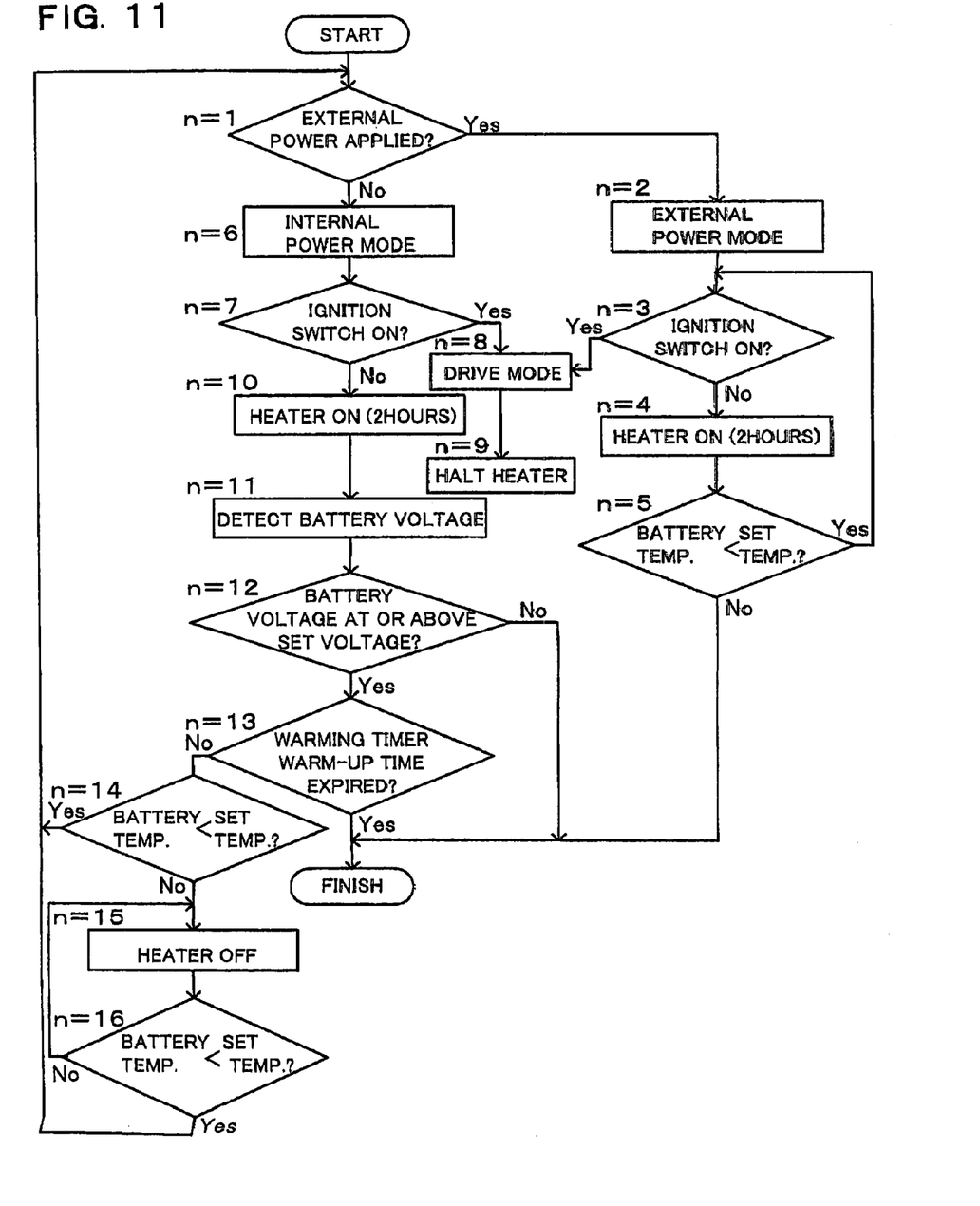
FIG. 11 is a flow-chart showing steps to warm-up rechargeable batteries of an embodiment of a car power source apparatus of the present invention.

The power source apparatus described above warms rechargeable batteries 20 during the warming-time of the warming timer 69 according to the flow-chart shown in FIG. 11 and described below.

[step n=1]
Determine whether or not external power is applied, specifically, whether or not commercial power is input.

[step n=2]
If commercial power is input, set the mode to external power mode. In this mode, the switching circuit 67 connects the AC/DC converter 62 to the heaters 40, and disconnects the DC/DC converter 61.

[step n=3]
In this mode, determine whether the ignition switch 68 (key) is on or not. If the ignition switch 68 is on, jump to step n=8 and set the mode to drive mode.

[step n=4]
If the ignition switch 68 is not on, turn the heaters 40 on to warm-up (heat) the driving battery 50 for 2 hours (commercial power timer set time).

[step n=5]
When the commercial power timer times-out (2 hours), compare battery temperature with the commercial power temperature setting (approximately 15° C. to 20° C.), and jump to step n=3 if battery temperature is less than the set temperature. Finish if battery temperature is higher than the set temperature.

[step n=6]
If commercial power is not input, specifically if external power is not applied, set the mode to internal power mode at this step. For internal power mode, connect the DC/DC converter 61 to the heaters 40, and supply power to the heaters 40 from the driving battery 50.

[step n=7]
At this step, determine whether the ignition switch 68 (key) is on or not.

[step n=8, 9]
If the ignition switch 68 is on, set the mode to drive mode and halt heater 40 operation.

[step n=10]
If the ignition switch 68 is not on, turn the heaters 40 on and warm-up (heat) the driving battery 50 for 2 hours (set time for the heater timer).

[step n=11, 12]
Detect battery voltage and check driving battery 50 remaining capacity based on the detected voltage. When detected voltage is below a set voltage, judge driving battery 50 remaining capacity to be below a set capacity (for example, 30%), do not supply power to the heaters 40, and end warm-up. Otherwise, if remaining capacity is greater than or equal to the set capacity, proceed to the following steps.

[step n=13]
When the set time of the heater timer, which is 2 hours, has elapsed, determine if the warming-time of the warming timer 69 has expired. This warming timer begins counting when the ignition switch is turned off. Finish if the warming-time of the warming timer 69 has expired.

[step n=14]
If the warming-time of the warming timer 69 has not expired, compare battery temperature with the set temperature in this step. If battery temperature is lower than the set temperature, jump to step n=1, loop through steps n=1, 6, 7, 10, 11, 12, and 13 and continue to warm-up (heat) the driving battery 50 until the warming time expires. Consequently, even if battery temperature does not reach the set temperature, warm-up will be ended in step 11, 12 if driving battery 50 remaining capacity drops below the set capacity.

Figure 12:
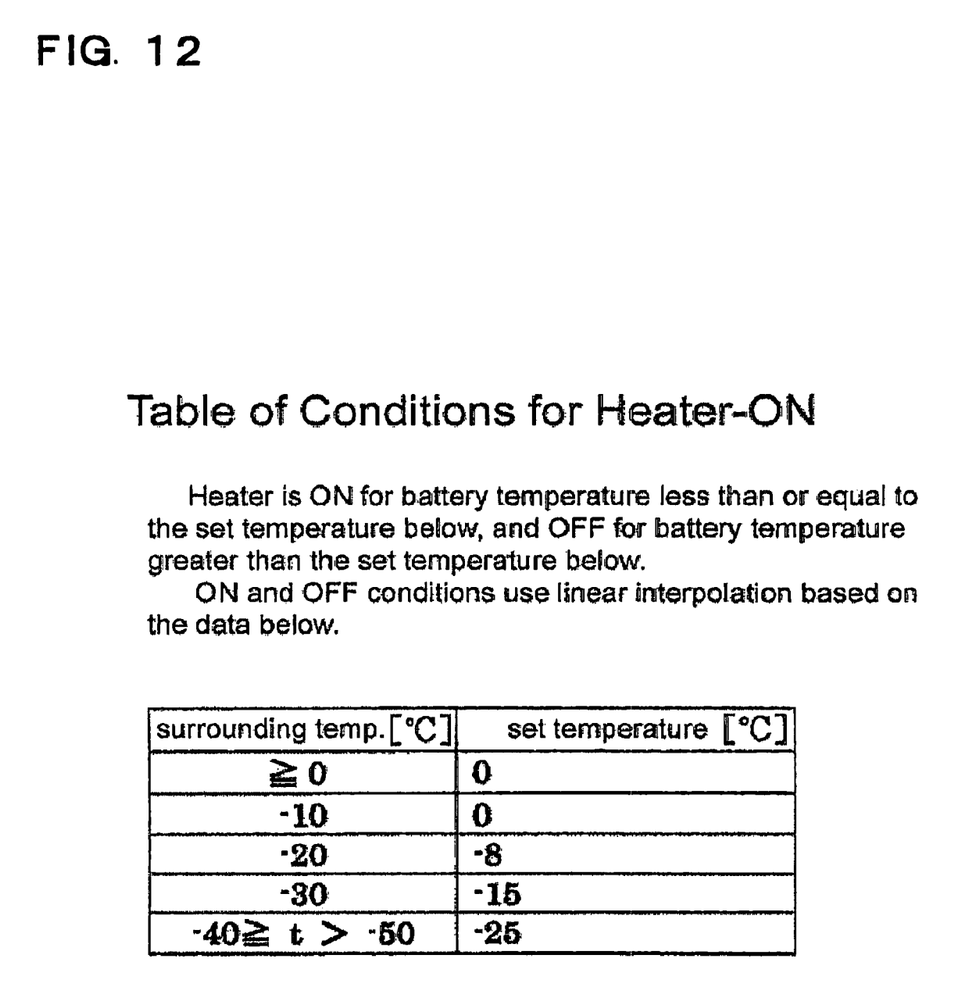
FIG. 12 is a table of conditions for turning the heaters on in an embodiment of a car power source apparatus of the present invention.

In the case where heating is provided by power from the driving battery 50, the set temperature is determined as follows. Temperature surrounding the driving battery 50 is measured via the surrounding temperature sensor 52, and the set temperature is determined by adding approximately 0 to 25° C. to the measured surrounding temperature. To reduce load on the battery, the set temperature is preferably equal to approximately 0 to 15° C. added to the surrounding temperature. Specifically, the set temperature is determined according to the table of FIG. 12. If surrounding temperature is less than or equal to −50° C., the heaters 40 are off, that is the control circuit 60 directs no power to the heaters 40. Further, if surrounding temperature is at or above a specified temperature, which is 0° C. in FIG. 12, a maximum set temperature is established, which is 0° C. in FIG. 12, corresponding to that specified temperature. The control circuit 60 controls the heaters 40 not to heat the driving battery 50 if battery temperature is greater than or equal to the maximum set temperature.

[step n=15, 16]
If battery temperature is not lower than the set temperature, specifically if battery temperature is higher than the set temperature, turn off power to the heaters 40. Subsequently, loop through steps n=15 and 16 until battery temperature becomes lower than the set temperature. When battery temperature becomes lower than the set temperature, jump to step n=1 and warm-up (heat) the driving battery 50.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on applications No. 2004-156872 filed in Japan on May 26, 2004, the content of which is incorporated hereinto by reference.

What is claimed is:

1. A car power source apparatus comprising:
   a driving battery which powers an electric motor to drive a car;

a plurality of heaters for heating the driving battery until a set temperature is reached;

a control circuit for controlling power to the heaters;

a temperature sensor for detecting battery temperature and issuing a detected temperature signal to the control circuit;

a surrounding temperature sensor for detecting temperature surrounding the driving battery and issuing a detected temperature signal to the control circuit, a switching circuit for switching a power supply to the heaters from the driving battery and from a commercial power source; and a warming timer for maintaining the driving battery in a warmed-up condition by operation of the heaters when an ignition switch of the car is turned off;

wherein the control circuit changes the set temperature corresponding to the surrounding temperature detected by the surrounding temperature sensor when the car is not being driven and the driving battery is heated via the heaters powered by the driving battery, wherein, when the heaters are powered by the driving battery, the control circuit controls power to the heaters until the warming timer times-out, and wherein, when an input of commercial power is detected and the heaters are powered by commercial power, the control circuit controls power to the heaters until the car is started.

2. A car power source apparatus as recited in claim 1 wherein the set temperature is a value equal to 0 to 15° C. added to the surrounding temperature.

3. A car power source apparatus as recited in claim 1, wherein the control circuit is operable to control the heaters not to heat the driving battery if the surrounding temperature is greater than or equal to a specified temperature and battery temperature is greater than or equal to a maximum set temperature.

4. A car power source apparatus as recited in claim 3, wherein the control circuit is operable to control the heaters not to heat the driving battery if the surrounding temperature is greater than or equal to 15° C. and battery temperature is greater than or equal to the maximum set temperature.

5. A car power source apparatus as recited in claim 1 wherein the warming-time stored in the warming timer is 12 hours to 36 hours.

6. A car power source apparatus as recited in claim 1, wherein the control circuit is operable to detect remaining capacity of the driving battery and control power to the heaters, and if remaining capacity of the driving battery drops to a minimum discharge capacity, the control circuit is operable to suspend power to the heaters and stop discharge of the driving battery.

7. A car power source apparatus as recited in claim 1 wherein the heaters are provided with a heating plate, and a plurality of rechargeable batteries are lined up parallel to each other and disposed in proximity to the surface of the heating plate.

8. A car power source apparatus as recited in claim 7, wherein rechargeable batteries are housed in a case, and the heating plate is attached to an upper surface of the case.

9. A car power source apparatus as recited in claim 7, wherein rechargeable batteries are housed in a case, and the heating plate is attached to a bottom surface of the case.

10. A car power source apparatus as recited in claim 8, wherein the case is provided with ventilating holes which pass through the case, a heating plate insulated board is provided with ventilation slits which pass through the insulated board, and the case ventilating holes and insulated board ventilation slits are opened in the same corresponding locations to form continuous ventilation paths.

11. A car power source apparatus as recited in claim 10, wherein the heating plate heats air via the heaters, and air heated via the heaters passes through the ventilation slits and ventilating holes to warm rechargeable batteries inside the case.

12. A car power source apparatus as recited in claim 7 wherein the heating plate heaters are capable of heating the heating plate, the heating plate heats the case by conduction, and the case in turn heats the rechargeable batteries.

13. A car power source apparatus as recited in claim 7, wherein the heating plate has a plurality of heaters mounted on an insulated board.

14. A car power source apparatus as recited in claim 11 wherein the heating plate has a plurality of heaters mounted on the insulated board, the insulated board has ventilation slits opened through it, and the heaters are mounted between the ventilation slits.

15. A car power source apparatus as recited in claim 7, wherein the heaters are mounted on a side of the heating plate facing the rechargeable batteries.

16. A car power source apparatus as recited in claim 1, wherein the driving battery includes a plurality of rechargeable batteries, and a case housing the rechargeable batteries of the driving battery is taken to be one case unit, case units are stacked and joined in two rows, an air duct is established by stacking two case units, and the heaters are disposed in the air duct.

* * * * *